(12) United States Patent
Antinori et al.

(10) Patent No.: US 11,675,578 B2
(45) Date of Patent: Jun. 13, 2023

(54) META-OPERATORS FOR MANAGING OPERATOR GROUPS

(71) Applicant: Red Hat, Inc., Raleigh, NC (US)

(72) Inventors: Paolo Antinori, Milan (IT); Alexandre Briani Kieling, Sao Paulo (BR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/197,301

(22) Filed: Mar. 10, 2021

(65) Prior Publication Data
US 2022/0291913 A1    Sep. 15, 2022

(51) Int. Cl.
*G06F 8/61*    (2018.01)
*G06F 9/50*    (2006.01)
*G06F 8/65*    (2018.01)

(52) U.S. Cl.
CPC ............ *G06F 8/63* (2013.01); *G06F 8/65* (2013.01); *G06F 9/5055* (2013.01); *G06F 9/5077* (2013.01)

(58) Field of Classification Search
CPC . G06F 8/63; G06F 8/65; G06F 9/5055; G06F 9/5077
See application file for complete search history.

(56) References Cited

U.S. PATENT DOCUMENTS

| | | | | |
|---|---|---|---|---|
| 7,653,687 B2* | 1/2010 | Reisman | ............ | G06Q 30/0609 709/219 |
| 8,549,410 B2* | 10/2013 | Hoyle | ............ | G06F 8/60 715/745 |
| 8,595,714 B1* | 11/2013 | Hamer | ............ | G06F 9/45558 718/1 |
| 8,627,328 B2* | 1/2014 | Mousseau | ............ | G06F 9/50 718/1 |
| 9,052,961 B2* | 6/2015 | Mangtani | ............ | G06F 9/5072 |
| 9,161,156 B2* | 10/2015 | Mall | ............ | G06F 8/71 |
| 11,099,823 B2* | 8/2021 | Gass | ............ | G06F 8/427 |
| 2007/0233999 A1* | 10/2007 | Jerding | ............ | H04L 69/24 711/171 |

(Continued)

FOREIGN PATENT DOCUMENTS

| | | | | | |
|---|---|---|---|---|---|
| CN | 103763392 | A | * | 4/2014 | |
| CN | 105446766 | A | * | 3/2016 | ............ G06F 15/16 |
| JP | 5649300 | B2 | * | 1/2015 | ............ G06F 8/65 |

OTHER PUBLICATIONS

Pan et al. "Effective metaheuristics for scheduling a hybrid flowshop with sequence-dependent setup times", 2017, Elsevier Inc. (Year: 2017).*

(Continued)

*Primary Examiner* — Qing Chen
*Assistant Examiner* — Junchun Wu
(74) *Attorney, Agent, or Firm* — Lowenstein Sandler LLP

(57) ABSTRACT

A method includes receiving, by a processing device, meta-operator generation data, the meta-operator generation data comprising an identifier of an operator of a group of operators to be installed on a containerized computing services platform, determining, by the processing device, that the group of operators is complete, and responsive to determining that the group of operators is complete, generating, by the processing device in view of the meta-operator generation data, a meta-operator comprising instructions for managing installation of the group of operators.

20 Claims, 8 Drawing Sheets

(56) References Cited

U.S. PATENT DOCUMENTS

| | | | | |
|---|---|---|---|---|
| 2011/0010699 | A1* | 1/2011 | Cooper | H04W 12/069 717/169 |
| 2013/0232498 | A1* | 9/2013 | Mangtani | G06F 9/5077 718/104 |
| 2013/0268925 | A1* | 10/2013 | Fuse | G06F 8/61 717/170 |
| 2015/0186128 | A1* | 7/2015 | Patton | G06F 8/65 717/170 |
| 2016/0162275 | A1* | 6/2016 | Morley | H04L 67/02 717/170 |
| 2017/0315795 | A1* | 11/2017 | Keller | G06F 11/3006 |
| 2020/0379742 | A1* | 12/2020 | Saluja | G06F 9/44505 |
| 2021/0117249 | A1* | 4/2021 | Doshi | H04L 67/1001 |
| 2021/0191769 | A1* | 6/2021 | Eschinger | G06F 11/1464 |
| 2022/0244934 | A1* | 8/2022 | Chen | G06F 8/63 |

OTHER PUBLICATIONS

Jia et al., "Energy modeling method of machine-operator system for sustainable machining", 2018, Elsevier Inc. (Year: 2018).*

Maltz et al., "Meta-Management System for GENI", Apr. 2007, Backbone Working Group (Year: 2007).*

Roland et al., "Operating Theatre Optimization : A Resource-Constrained Based Solving Approach", 2006, IEEE (Year: 2006).*

DirectedSoul, "Hyper Converged Operator", https://kubevirt.io/2019/Hyper-Converged-Operator.html, 8 pages, Publication Date: Apr. 17, 2019.

Scholz, Jakub, "Deploy Apache Kafka in few seconds with Strimzi and Operator Framework and Operator Lifecycle Manager", https://strimzi.io/blog/2019/03/06/strimzi-and-operator-lifecycle-manager/, 5 pages, Mar. 6, 2019.

* cited by examiner

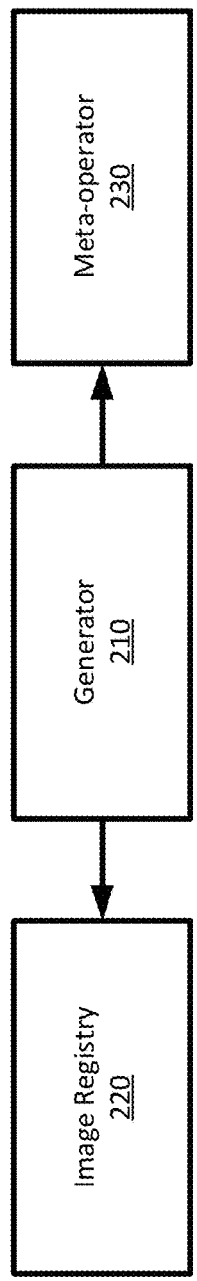
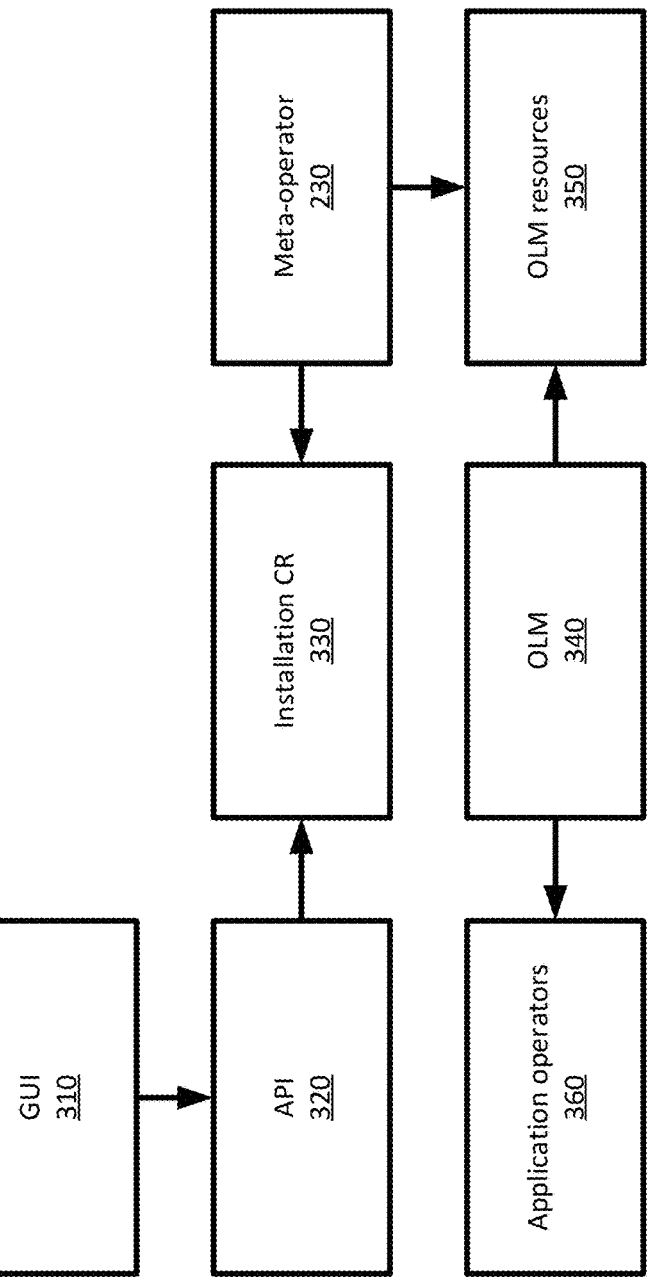

META-OPERATORS FOR MANAGING OPERATOR GROUPS

TECHNICAL FIELD

The present disclosure is generally related to computer systems, and more particularly, to meta-operators for managing operator groups.

BACKGROUND

Platform-as-a-Service (PaaS) system offerings can include software and/or hardware facilities for facilitating the execution of web applications in a cloud computing environment (the "cloud"). Cloud computing is a computing paradigm in which a user engages a "cloud provider" to execute a program on computer hardware owned and/or controlled by the cloud provider. A cloud provider can make virtual machines (VMs) and/or containers hosted on its computer hardware available to customers for this purpose. A container is a "lightweight" execution environment having relaxed isolation properties (as compared to VMs) for sharing an Operating System (OS) among applications. Similar to a VM, a container can have its own filesystem, share of CPU, memory, process space, etc. A container for an application can be packaged, together with libraries and dependencies and decoupled from the underlying infrastructure, making the container portable (e.g., portable across clouds and OS distributions). The cloud provider can provide an interface that a user can use to requisition VMs and/or containers and associated resources such as security policies, processors, storage, and network services, etc., as well as an interface to install and execute the user's applications and files. PaaS system offerings can facilitate deployment of web applications without the cost and complexity of buying and managing the underlying hardware and software and provisioning hosting capabilities, providing the facilities to support the complete life cycle of building and delivering web applications and services entirely available from the Internet.

BRIEF DESCRIPTION OF THE DRAWINGS

The present disclosure is illustrated by way of example, and not by way of limitation, and can be more fully understood with reference to the following detailed description when considered in connection with the figures in which:

FIG. 2 depicts a block/flow diagram of a system for generating a meta-operator to manage a group of operators, in accordance with one or more aspects of the present disclosure.

FIG. 3 depicts a block/flow diagram of a system for installing the meta-operator and the group of operators of FIG. 2, in accordance with one or more aspects of the present disclosure.

DETAILED DESCRIPTION

Figure 1:
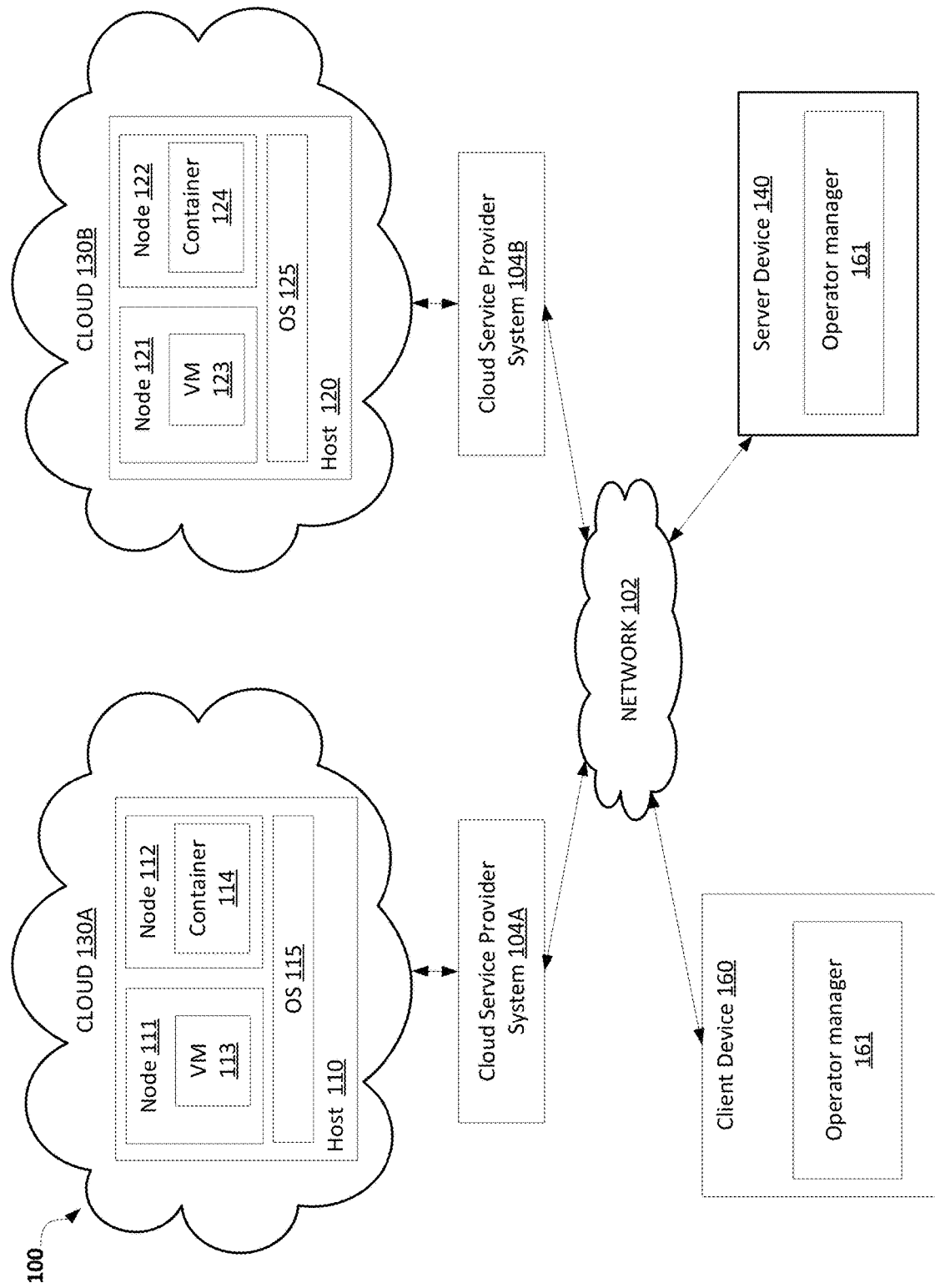
FIG. 1 depicts a high-level component diagram of an example computer system architecture, in accordance with one or more aspects of the present disclosure.

Described herein are methods and systems for meta-operators for installing operator groups associated with a container-orchestration system. Container-orchestration systems, such as Kubernetes, can be used to manage containerized workloads and services, and can facilitate declarative configuration and automation. Container-orchestration systems can have built-in features to manage and scale stateless applications, such as web apps, mobile backends, and application programming interface (API) services, without requiring any additional knowledge about how these applications operate. However, stateful applications, like databases and monitoring systems, may require additional domain-specific knowledge that a container-orchestration system does not have. Such additional domain-specific knowledge may be needed in order to scale, upgrade, and reconfigure stateful applications.

A containerized computing services platform refers to an enterprise-ready container platform with full-stack automated operations that can be used to manage, e.g., hybrid cloud and multicloud deployments. A containerized computing services platform uses operators to autonomously run the entire platform while exposing configuration natively through objects, allowing for quick installation and frequent, robust updates. For example, the containerized computing service platform can be Red Hat® OpenShift®.

As used herein, an operator is an application for packaging, deploying, and managing another application within a containerized computing services platform associated with a container-orchestration system. An operator can encode the domain-specific knowledge needed to scale, upgrade and reconfigure a stateful application into extensions (e.g. Kubernetes extensions) for managing and automating the life cycle of an application. More specifically, applications can be managed using an application programming interface (API), and operators can be viewed as custom controllers (e.g., application-specific controllers) that extend the functionality of the API to generate, configure, and manage applications and their components within the containerized computing services platform. In a container-orchestration system, a controller is an application that implements a control loop that monitors a current state of a cluster, compares the current state to a desired state, and takes application-specific actions to match the current state with the desired state in response to determining the state does not match the desired state. An operator, as a controller, can continue to monitor the target application that is being managed, and can automatically back up data, recover from failures, and upgrade the target application over time. Additionally, an operator can perform management operations including application scaling, application version upgrades, and kernel module management for nodes in a computational cluster with specialized hardware. Accordingly, operators can be used to reduce operational complexity and automate tasks within a containerized computing services platform, beyond the basic automation features that may be provided within a containerized computing services platform and/or container-orchestration system.

Operators can implement Custom Resources (CRs) to manage applications and their components. CRs are API extension mechanisms that provide high-level configurations and settings. CRs can allow introduction of a custom API into a project or a cluster. A CR Definition (CRD) defines a CR and lists out all of the configurations available to users of the operator. The control loop of an operator can watch a CR type and take application-specific actions to make the current state match the desired state.

A problem encountered with application management is the ability to easily install multiple operators simultaneously. In some implementations, a single operator can be built for installing multiple operators. However, such an approach forces developers to write new software for each single operator. Accordingly, building the single operator can be a large and complex project that may require many humans (e.g., software engineers).

Aspects of the present disclosure address the above noted and other deficiencies by meta-operators for managing groups of operators. As used herein, a "meta-operator" is an operator or controller that is automatically generated for managing (e.g., installing) a group of operators on a containerized computing services platform associated with a container-orchestration system, and a "group of operators" or an "operator group" refers to a collection or set of operators that are designated or selected to be managed by the meta-operator. More specifically, a computer system can implement a build-time tool, referred to herein as a "meta-operator generator" or "generator," to automatically generate a meta-operator for managing the group of operators.

Aspects of the present disclosure can further provide a customized graphical user interface (GUI) that can depict an intuitive and practical GUI when displayed in within the containerized computing services platform. The customized GUI can be output based on the automated generation of metadata needed by the containerized computing services platform, and via introspections of target operations and the distribution of operator aggregates. Accordingly, aspects of the present disclosure can be used to generate a meta-operator that can easily and automatically install a group of operators without requiring any manual coding from users (e.g., software engineers). Additionally, aspects of the present disclosure replace the development-based manual or programmatic approach for operator generation and installation with a declarative configuration approach.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as Red Hat® OpenShift®. The PaaS system provides resources and services (e.g., micro-services) for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes one or more cloud-computing environment 130A, 130B (also referred to herein as a cloud(s)) that includes nodes 111, 112, 121, 122 to execute applications and/or processes associated with the applications. A "node" providing computing functionality may provide the execution environment for an application of the PaaS system. In some implementations, the "node" may include a virtual machine (VMs 113, 123) that is hosted on a physical machine, such as host 110, 120 implemented as part of the clouds 130A, 130B. For example, nodes 111 and 112 are hosted on physical machine of host 110 in cloud 130A provided by cloud provider 104A. Similarly, nodes 121 and 122 are hosted on physical machine of host 120 in cloud 130B provided by cloud provider 104B. In some implementations, nodes 111, 112, 121, and 122 may additionally or alternatively include a group of VMs, a container (e.g., container 114, 124), or a group of containers to execute functionality of the PaaS applications. When nodes 111, 112, 121, 122 are implemented as VMs, they may be executed by operating systems (OSs) 115, 125 on each host machine 110, 120. It should be noted, that while two cloud providers systems have been depicted in FIG. 1, in some implementations more or fewer cloud service provider systems 104 (and corresponding clouds 130) may be present.

In some implementations, the host machines 110, 120 can be located in data centers. Users can interact with applications executing on the cloud-based nodes 111, 112, 121, 122 using client computer systems (not pictured), via corresponding client software (not pictured). Client software may include an application such as a web browser. In other implementations, the applications may be hosted directly on hosts 110, 120 without the use of VMs (e.g., a "bare metal" implementation), and in such an implementation, the hosts themselves are referred to as "nodes".

In various implementations, developers, owners, and/or system administrators of the applications may maintain applications executing in clouds 130A, 130B by providing software development services, system administration services, or other related types of configuration services for associated nodes in clouds 130A, 130B. This can be accomplished by accessing clouds 130A, 130B using an application programmer interface (API) within the applicable cloud service provider system 104A, 104B. In some implementations, a developer, owner, or system administrator may access the cloud service provider system 104A, 104B from a client device (e.g., client device 160) that includes dedicated software to interact with various cloud components. Additionally, or alternatively, the cloud service provider system 104A, 104B may be accessed using a web-based or cloud-based application that executes on a separate computing device (e.g., server device 140) that communicates with client device 160 via network 102.

Client device 160 is connected to hosts 110 in cloud 130A and host 120 in cloud 130B and the cloud service provider systems 104A, 104B via a network 102, which may be a private network (e.g., a local area network (LAN), a wide area network (WAN), intranet, or other similar private networks) or a public network (e.g., the Internet). Each client 160 may be a mobile device, a PDA, a laptop, a desktop computer, a tablet computing device, a server device, or any other computing device. Each host 110, 120 may be a server computer system, a desktop computer or any other computing device. The cloud service provider systems 104A, 104B may include one or more machines such as server computers, desktop computers, etc. Similarly, server device 140 may include one or more machines such as server computers, desktop computers, etc.

In some implementations, the client device 160 may include an operator manager 161 that can receive, generate, or otherwise maintain meta-operators for installing multiple operators. More specifically, a meta-operator can be generated by operator manager 161 upon receiving data from the user associated with the client device 160, and the multiple operators corresponding to the meta-operator can be installed from the corresponding configuration any suitable. For example, operator manager 161 can provide a graphical user interface (GUI), and the user associated with the client device 160 can provide data via the GUI to cause operator manager 161 to generate the meta-operator. The process performed by operator manager 161 can be invoked in a number of ways, such as, e.g., a web front-end and/or a command line interface (CLI) tool.

Operator manager 161 may be an application that executes entirely on client device 160. In other implementations, operator manager 161 may function in whole or in part on server device 140. In such instances, operator manager 161 can function as a web-based or cloud-based application that is accessible to the user via a web browser or thin-client user interface that executes on client device 160. In some implementations, a portion of operator manager 161 may execute on client device 160 and another portion of operator manager 161 may execute on server device 140. While aspects of the present disclosure describe operator manager 161 as implemented in a PaaS environment, it should be noted that in other implementations, operator manager 161 can also be implemented in an Infrastructure-as-a-Service (Iaas) environment associated with a containerized computing services platform, such as Red Hat® OpenStack®. The functionality of operator manager 161 to generate a meta-operator will now be described in further detail below with respect to FIG. 2.

FIG. 2 depicts a block/flow diagram illustrating a system 200 for generating a meta-operator to manage a group of operators, in accordance with one or more aspects of the present disclosure. The generation can be managed by the operator manager 161 of FIG. 1.

As shown, the system 200 includes a generator tool ("generator") 210. The generator 210 is associated with a containerized computing services platform and is utilized to perform a meta-operator generation process. For example, the meta-operator generation process can be invoked from one or more of a web front-end, a command line interface (CLI) tool, etc. The containerized computing services platform can be associated with any suitable container-orchestration system. In some embodiments, the containerized computing services platform is be Red Hat® OpenShift® and the container-orchestration system is Kubernetes. However, such embodiments should not be considered limiting.

After the generator 210 is initialized, the generator 210 requests, e.g., via a graphical user interface (GUI) or an application programming interface (API), meta-operator metadata. The meta-operator metadata includes metadata for defining a meta-operator to be generated. For example, the meta-operator metadata can include an identifier of the meta-operator, a description of the meta-operator, an icon of the meta-operator, etc.

The generator 210 then requests, via the GUI or API, an identifier of a first operator of a group of operators to be installed by the meta-operator. In response to receiving the identifier of the operator, the generator 210 queries an operator container image registry ("image registry") 220 to generate a list of operators matching the name of the operator. For example, a user can enter the URL of an image registry where operator bundle images are stored. The operator bundle images can be specified by the operator framework and can include metadata about the operators. The generator 210 can then display the list of operators, and receive, via the GUI or the API, a selection of an operator from the list to be designated as the first operator.

After receiving the selection, the generator 210 can download first operator metadata from the image registry 220. The first operator metadata includes metadata for managing installation of the first operator. In some embodiments, the first operator metadata includes a Cluster Service Version (CSV) of an operator container image. For example, the second metadata can include one or more of name, description, icon, available versions, deployment details, required cluster privileges, etc. A CSV can be used to fill GUIs with such metadata and can also be a source of technical information needed to run the corresponding operator. The generator 210 can then, based on the first operator metadata, request, via the GUI or API, additional information for installing the first operator. The additional information for installing the first operator can include the version that should be installed, the installation namespace, the installation scope (e.g., cluster wide or namespace), the upgrade strategy (e.g., automatic or manual), etc.

This process can be repeated for each additional operator of the group of operators. For example, if the meta-operator is to manage a group of three operators, the process can be repeated for a second operators of the group of operators and a third operators of the group of operators.

The generator 210 can then receive, via the GUI or API, a command from to generate the meta-operator for installing the group of operators. In response to receiving the command, the generator 210 can generate the meta-operator. For example, the meta-operator can be generated using a software development kit (SDK), a set of function-specific templates, and/or code generation tools.

The generated code corresponding to the meta-operator can include pre-installation validations to validate that installation can proceed, and post-installation validations to validate that execution was successful. For example, the generator 210 could present a list of pre-installation and/or post-installation validations that can be added to the meta-operator. The generator 210 can receive a selection of one or more of the validations to complete the source code generation for the meta-operator, and then compile the complete source code. Examples of pre-installation validations include checking that the operators are compatible with the cluster, checking that there are sufficient resources (e.g., cluster resources) for the installation, etc. An example of a post-installation includes checking that the cluster is healthy after the installation.

The meta-operator can include an Installation Custom Resource (CR) that can trigger installation. Installation instructions can include logic to generate additional resources that are not generated by any individual operator, but may be needed to be added for successful execution of the whole solution (e.g., services and routes, and monitoring and alerting configuration). A description of the installation of the meta-operator 230 and corresponding group of operators will now be described below with reference to FIG. 3.

FIG. 3 depicts a block/flow diagram illustrating a system 300 for installing the meta-operator 230. The installation can be managed by the operator manager 161 of FIG. 1. The meta-operator 230 is associated with a containerized computing services platform and is utilized to perform operator management and/or installation. The containerized computing services platform can be associated with any suitable container-orchestration system. In some embodiments, the containerized computing services platform is be Red Hat®

OpenShift® and the container-orchestration system is Kubernetes. However, such embodiments should not be considered limiting.

As shown, the system 300 includes GUI 310 and an API 320. The meta-operator 230 can be installed via the GUI 310 and/or the API 320. The API 320 can be used to generate an Installation Custom Resource (CR) 330 that includes information for installation of the operators of the group designated by the meta-operator 230. Alternatively, these steps can be performed via a text input. The Installation CR 330 can enable the GUI 310 to provide an up-to-date version of the operator installation process in a single, concise view. The meta-operator 230 can detect the generation of the Installation CR 330 and install the operators of the group of operators based on information contained in the Installation CR 330.

More specifically, the content of the Installation CR 330 can be used by the meta-operator to generate resources that serve as the basis of an Operator Lifecycle Manager (OLM) 340, referred to as OLM resources 350. The OLM 340 is a management framework that provides a declarative way of installing, managing and upgrading operators and corresponding dependencies within a cluster, and thus helps users install, update, and manage the lifecycle of all operators and their associated services running across their clusters. The OLM 340 can then install application operators 360 designated by the meta-operator 230.

For example, the OLM 340 can include an OLM operator and a Catalog operator responsible for creating and/or managing the OLM resources 350. Examples of OLM resources 350 can that can be created by the OLM operator and the Catalog operator include, e.g., Deployments, ServiceAccounts, (Cluster)Roles, (Cluster)RoleBindings, CRDs, and CSVs. Deployments, ServicesAccounts, (Cluster)Roles and (Cluster)RoleBindings are owned by the OLM operator, and CRDs and CSVs are owned by the Catalog operator. Examples of OLM resources 350 that can be managed by the OLM operator and Catalog operator include, e.g., a Cluster Service Version (CSV) resource, an InstallPlan resource, a CatalogSource resource, a Subscription resource, and an OperatorGroup resource.

For example, the CSV resource can be created by the OLM 340 for each operator and includes metadata that assists the OLM 340 in running the operator in a cluster. More specifically, the CSV resource can include a number of fields that describe information pertaining to the installation of the operator. For example, a Status field can describe the installation status of the operator, a Phase field can indicate whether the installation of the operator is a success or failure, and a Message field can provide further information describing why the installation of the operator was a success or a failure. The meta-operator can read these fields from the CSV for each operator and create a Status field in the Installation CR 330 called Conditions, which is a field of CustomResourceDefinitionStatus. Some GUIs (e.g., OpenShift® web console), know what Conditions are and automatically show them in the custom resource details page. The Conditions field can be updated by reading values from corresponding OLM resources 350. Accordingly, the CSV can be used to populate GUIs with information like its logo, description, and version.

The InstallPlan resource can be owned by the Catalog operator and includes a list of resources to be created in order to automatically install or upgrade a CSV. The CatalogSource resource can be owned by the Catalog operator and is a repository of CSV, CRDs, and packages that define an application. The Subscription resource can be owned by the Catalog operator and keeps CSVs up to date by tracking a channel in a package. The OperatorGroup resource can be owned by the OLM operator and configures all operators deployed in the same namespace as an OperatorGroup object to watch for their CR in a list of namespaces or cluster-wide.

Figure 4:
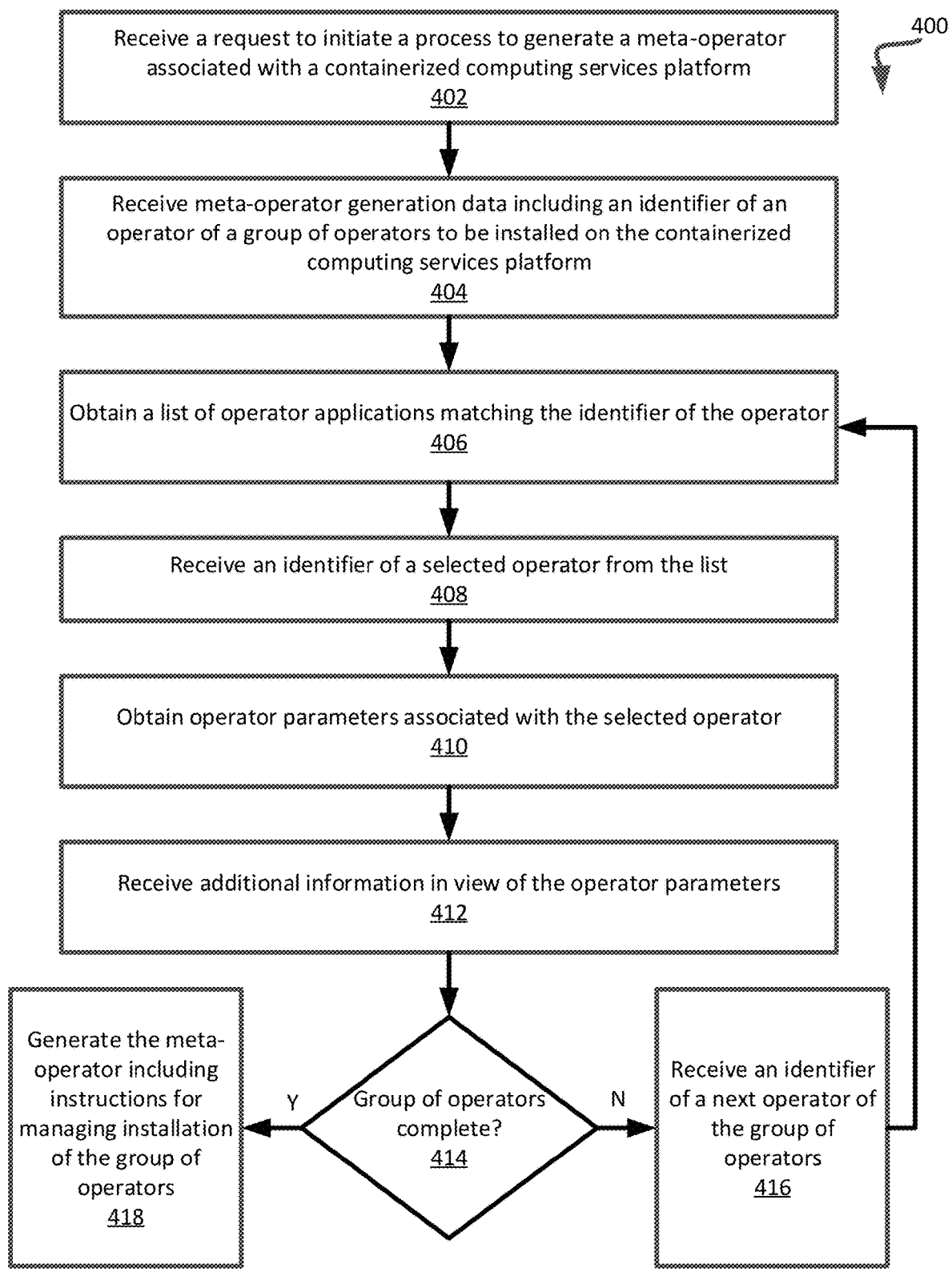
FIG. 4 depicts a flow diagram of a method for generating a meta-operator to manage a group of operators, in accordance with one or more aspects of the present disclosure.

FIG. 4 depicts a flow diagram of an example method 400 for generating a meta-operator to install a group of operators, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In an illustrative example, method 400 may be performed by a generator, such as the generator 210 in FIG. 2. Alternatively, some or all of method 400 might be performed by another module or machine. It should be noted that blocks depicted in FIG. 4 could be performed simultaneously or in a different order than that depicted.

At block 402, processing logic receives a request to initiate a process to generate a meta-operator associated with a containerized computing services platform. For example, the meta-operator generation process can be initiated from, e.g., a web front-end, a command line interface (CLI) tool, via an application programing interface (API), etc. The containerized computing services platform can be associated with any suitable container-orchestration system. In some embodiments, the containerized computing services platform is Red Hat® OpenShift® and the container-orchestration system is Kubernetes. However, such embodiments should not be considered limiting.

At block 404, processing logic receives a set of meta-operator generation data. The meta-operator generation data can include an identifier (e.g., name) of an operator of a group of operators to be managed by the meta-operator. The meta-operator generation data can further include a set of meta-operator parameters. The set of meta-operator parameters can include a meta-operator name, meta-operator description, icon, etc. Receiving the meta-operator generation data can include sending one or more requests to the user for the meta-operator data, and receiving the meta-operator generation data via a GUI and/or an API.

At block 406, processing logic obtains a list of operators matching the identifier of the operator. In some embodiments, obtaining the list includes querying an operator container image registry ("image registry"). For example, a user can enter the URL of an image registry where operator bundle images are stored. The operator bundle images can be specified by the operator framework and can include metadata about the operators.

At block 408, processing logic receives an identifier of a selected operator from the list. Receiving the identifier of the selected operator from the list can include sending the list to the user, and receiving a selection from the user corresponding to the selected operator.

At block 410, processing logic obtains operator parameters associated with the selected operator. For example, the operator parameters can be downloaded from the image registry. The operator parameters can include an identifier (e.g., name), description, icon, available versions, deployment details, required cluster privileges, etc. In some embodiments, obtaining the operator parameters includes obtaining Cluster Service Version (CSV) metadata about the selected operator.

At block 412, processing logic receives additional information in view of the operator parameters. For example, receiving the additional information can include sending a request to the user to provide additional information. The additional information can include the version that should be installed, the installation namespace, the installation scope (e.g., cluster wide or namespace), the upgrade strategy (e.g., automatic or manual), etc.

At block 414, processing logic determines if the group of operators is complete. Determining that the group of operators is complete can include receiving an indication via the GUI and/or API acknowledging that there are no further operators to be managed by the meta-operator. For example, the indication can be generated in response to a user selecting an appropriate button displayed by the GUI. If not, the processing logic at block 416 receives an identifier of a next operator of the group of operators, and reverts back to block 406 to obtain a list of operator applications the name of the next operator.

Otherwise, if the group of operators is determined to be complete, the meta-operator generation process can commence. At block 416, processing logic generates the meta-operator including instructions for managing installation of the group of operators. For example, the meta-operator can be generated in response to receiving a command from the user to generate the meta-operator. The meta-operator can be generated in view of the meta-operator generation data, operator parameters, additional information, etc. The meta-operator can be generated using one or more of a software development kit (SDK), a set of templates, instruction generation tools, etc.

The instructions for managing operator installation can include an Installation Custom Resource (CR) for triggering the installation. The instructions for managing operator installation can further include pre-installation validations. When executed, the pre-installation validations can implement a pre-installation phase include a validation sub-phase and a creation sub-phase. During the validation sub-phase, it is determined if the user has enough resources (e.g., Kubernetes resources) to successfully perform the installation and/or if the cluster (or user) already has access to specific additional services (e.g., other operators, deployment, services, routes, users, permissions). During the creation sub-phase, any required resources that may not be covered by the managed group of operators can be created. Accordingly, the meta-operator can implement instructions to generate any resources necessary for installation.

The instructions for managing operator installation can further include installation phase instructions. When executed, the installation phase instructions can implement an installation phase. For example, the installation phase instructions can be used to control aspects like ordering of operator installation, can provide advanced support for dependencies, can support installation of multiple versions of a same operator (if needed), enforce requirements on different namespaces (e.g., according to user preference), handle channel upgrade by enabling channel change (e.g., if an operator defines a version 2 channel, an operator installed using a version 1 channel can automatically be bumped to use the version 2 channel), etc.

The instructions for managing operator installation can further include post-installation validations to ensure that installation is successful. When executed, the post-installation validations can implement a post-installation phase. During the post-installation phase, validation of specified conditions can be automatically tested, notifications of the installation can be generated (e.g., emails, alert systems), automatic registration with monitoring systems can be performed, etc.

Figure 5:
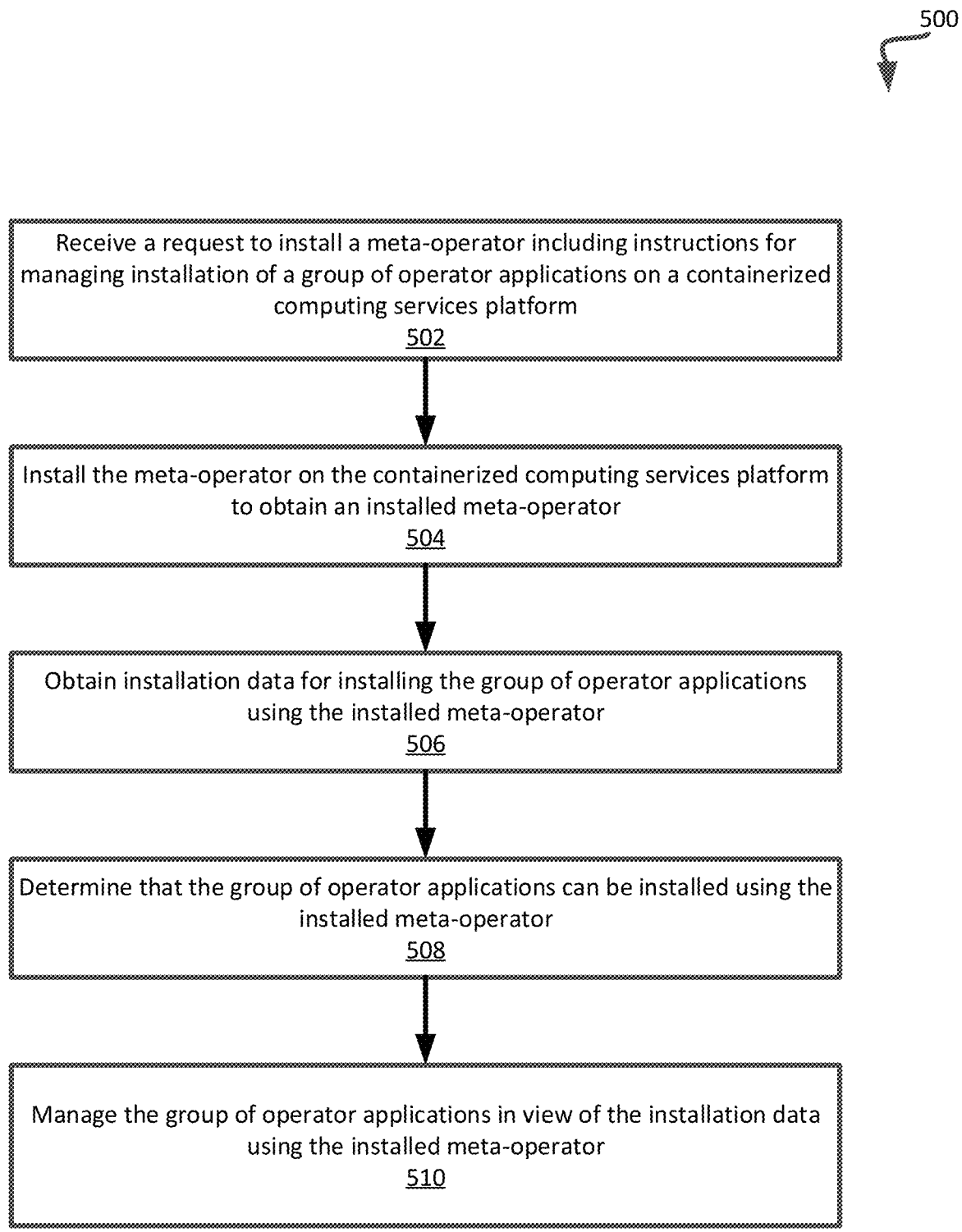
FIG. 5 depicts a flow diagram of a method for installing a meta-operator and group of operators, in accordance with one or more aspects of the present disclosure.

FIG. 5 depicts a flow diagram of an example method 500 for installing a meta-operator and corresponding group of operators, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. It should be noted that blocks depicted in FIG. 5 could be performed simultaneously or in a different order than that depicted.

At block 502, processing logic receives a request to install a meta-operator including instructions for managing installation of a group of operators on a containerized computing services platform. For example, the request can be received from a user via a graphical user interface (GUI) and/or API. The containerized computing services platform can be associated with any suitable container-orchestration system. In some embodiments, the containerized computing services platform is Red Hat® OpenShift® and the container-orchestration system is Kubernetes. However, such embodiments should not be considered limiting.

At block 504, processing logic installs the meta-operator on the containerized computing services platform to obtain an installed meta-operator.

At block 506, processing logic obtains installation data for installing the group of operators using the installed meta-operator. For example, obtaining the installation data can include generating the installation data based on input received from the user via the GUI. For example, generating the installation data can include invoking an API to generate the installation data. Alternatively, this step can be performed via a text input.

In some embodiments, the installation data includes an Installation Custom Resource (CR). The content of the Installation CR can be used by the meta-operator to generate, on behalf of the user, corresponding Operator Lifecycle Manager (OLM) resources or objects. The Installation CR can enable the UI to provide an up-to-date version of the installation process in a single concise view. In some embodiments, the installation data further includes instructions for managing instruction of the group of operators using the meta-operator (e.g., pre-installation validation instructions and post-installation validation instructions). Further details regarding the installation data including the Installation CR, and the OLM resources, are described above with reference to FIG. 3.

At block 508, processing logic determines that the group of operators can be installed using the installed meta-operator. For example, determining that the group of operators can be installed can include executing pre-installation validation instructions, as described in further detail above with reference to FIG. 4.

In response to determining that the group of operators can be installed, at block 510, processing logic manages the group of operators in view of the installation data using the installed meta-operator. For example, the instructions for managing operator installation can further include installation phase instructions, as described in further detail above with reference to FIG. 4. For example, installing the group of operators can include generating the OLM resources, and triggering the installing of the group of operators using the OLM resources.

Installing the group of operators can further include determining that the installation of the group of operators was successful. For example, determining that the installation of the group of operators was successful can include executing post-installation validation instructions, as described in further detail above with reference to FIG. 4.

Installation progress and installation results can be shown to the user via the GUI. For example, the meta-operator can read values from the OLM objects, and update a conditions field of the Installation CRD, thereby allowing the GUI to give an up-to-date version of the installation process in a single concise view. The installation results can include additional information (e.g., additional information retrieved from the OLM).

An illustrative example of the generation of a meta-operator "Demo Operator," in accordance with the embodiments described above with reference to FIGS. 2 and 4, and the installation of the meta-operator and associated operators in accordance with the embodiments described above with reference to FIGS. 3 and 5, will now be provided.

After initiating a meta-operator generator application ("generator"), a user can enter a meta-operator metadata including an identifier via a GUI. In this example, the identifier includes the name "Demo Operator." The user can then enter information into other fields. In this example, the installation type is designated by the user as cluster-wide and the upgrade strategy is designated by the user as automatic. The generator can then create a new operator project using an SDK, and installation data including an Installation CR that will be used to trigger the installation of the operators to be managed by the meta-operator. The user can then enter the URL of the image registry where operator bundle images are stored. The user can identify a first operator to be managed by "Demo Operator," which in this example is "PostgreSQL". The user can enter a search term "PostgreSQL". The generator can then query all bundle images that contain "PostgreSQL" in their names and list the results. The user can select one of the results as a selected bundle image. The generator can read the image labels of the selected bundle image. The operator framework specifies a list of labels that each bundle image contains, including a package name that identifies the operator and a list of update channels. The user then selects one of the update channels. The user can enter an installation type (e.g., cluster-wide) and upgrade strategy (e.g., automatic). The generator can then generate the code in the meta-operator that will create a Subscription object to install the first operator. These steps can be repeated to identify each additional operator that is to be managed by the meta-operator. Then, the generator can be terminated.

After Demo Operator is generated, Demo Operator can then be installed on a cluster (e.g., a Kubernetes cluster). An instance of the Installation CR can be created, and Demo Operator can detect the instance of the Installation CR and initiate installation. An example of an instance of an Installation CR is illustrated below with reference to FIG. 6. For each operator to be managed by Demo Operator, Demo Operator generates data including a namespace (and OperatorGroup object if in namespace mode), and a Subscription object with the installation details required by the OLM. The OLM detects the Subscription instances and starts the installation of the operators (e.g., creation of Roles, RoleBindings, Deployments, etc.) Installation status can be presented with information extracted by the CSV objects created by the OLM, which is illustratively depicted below with reference to FIGS. 7 and 8. Then, the installation is complete.

Figure 6:
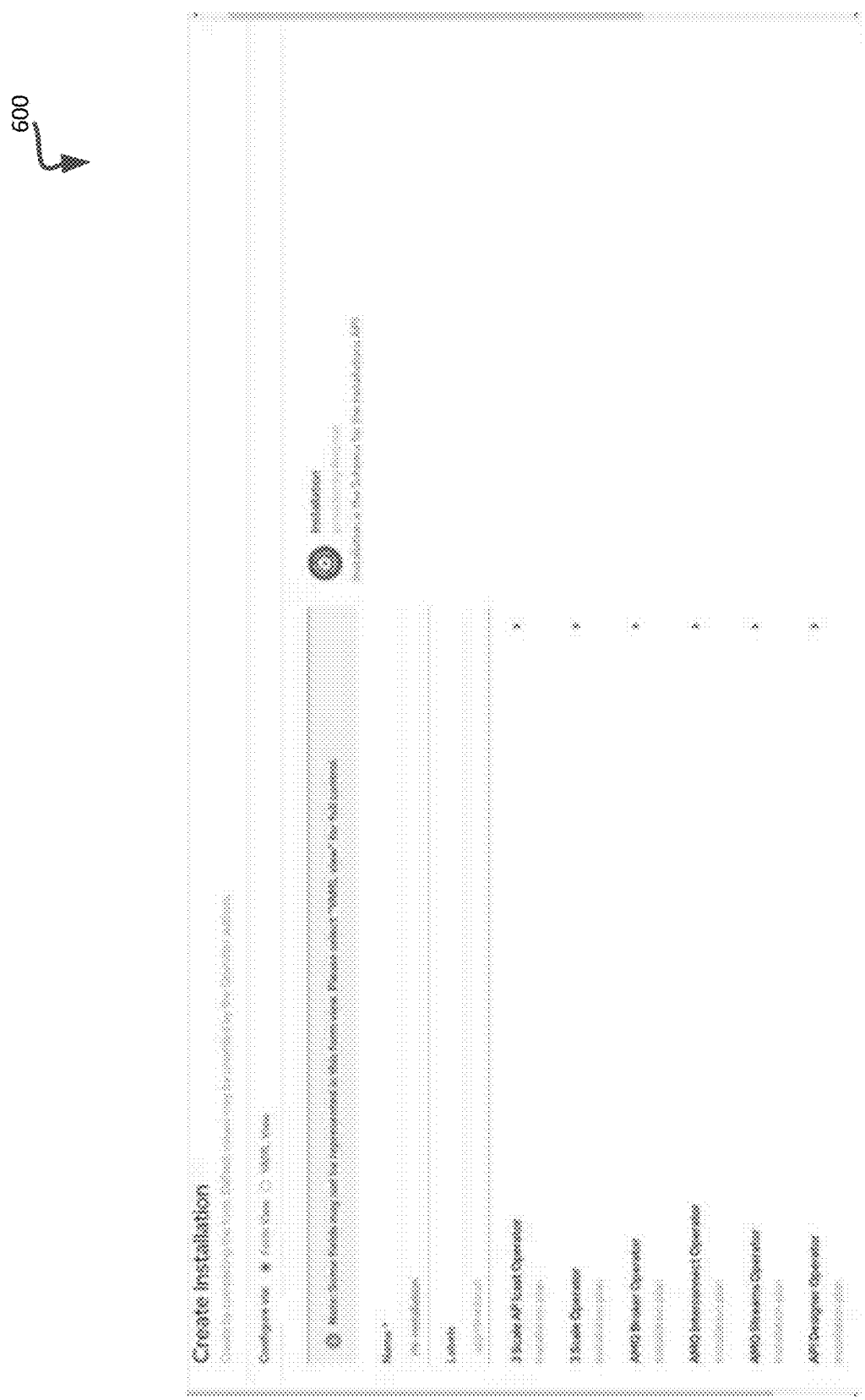
FIGS. 6-8 depict exemplary graphical user interfaces (GUIs) in accordance with one or more aspects of the present disclosure.
Figure 7:
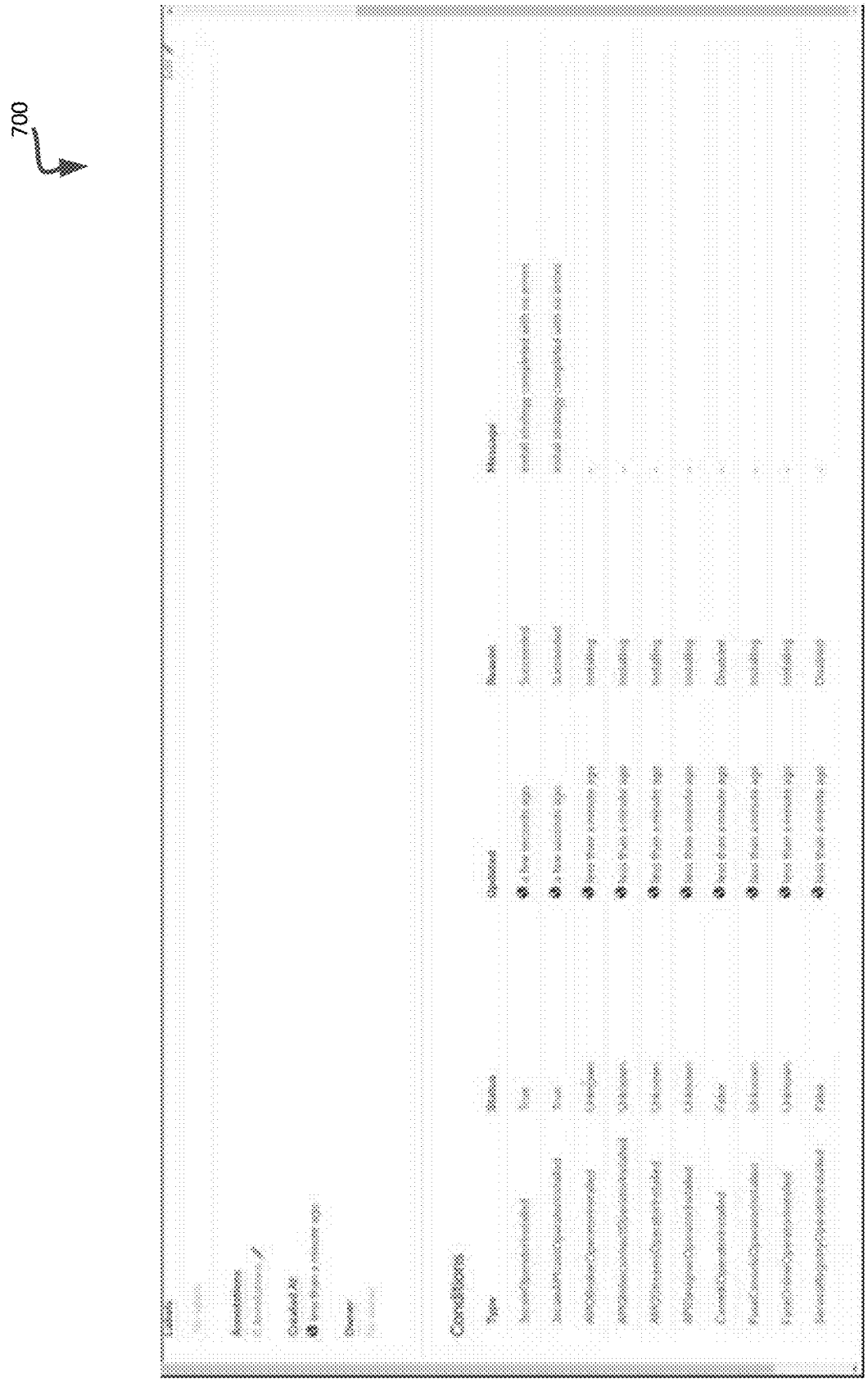
Figure 8:
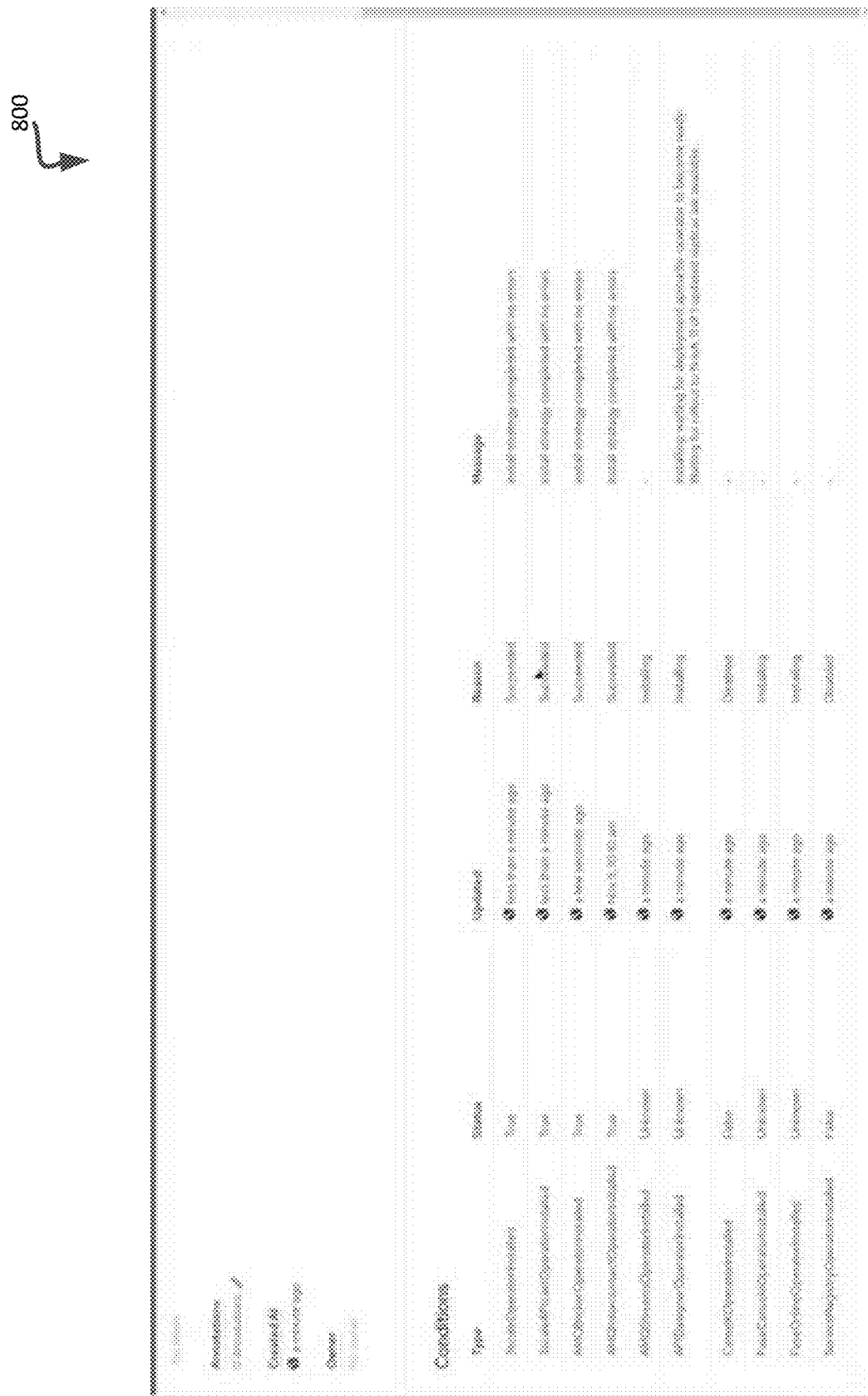

FIG. 6 is an example graphical user interface (GUI) 600 depicting the creation of an Installation CR, which contains fields to customize the installation of each managed operator, such as installation mode (e.g., cluster-wide or namespaced). FIG. 7 is a first example of a graphical user interface (GUI) 700 depicting installation status of a group of operators managed by a meta-operator, and FIG. 8 is a second example of a GUI 800 depicting installation status of a group of operators managed by a meta-operator. Each condition type represents a successful installation, which can be true, false, or unknown (while installing), the last time the status was updated, the reason the status is what it is, and a message describing what is currently happening. The reason and message information can be retrieved from ClusterServiceVersion (CSV) objects.

Figure 9:
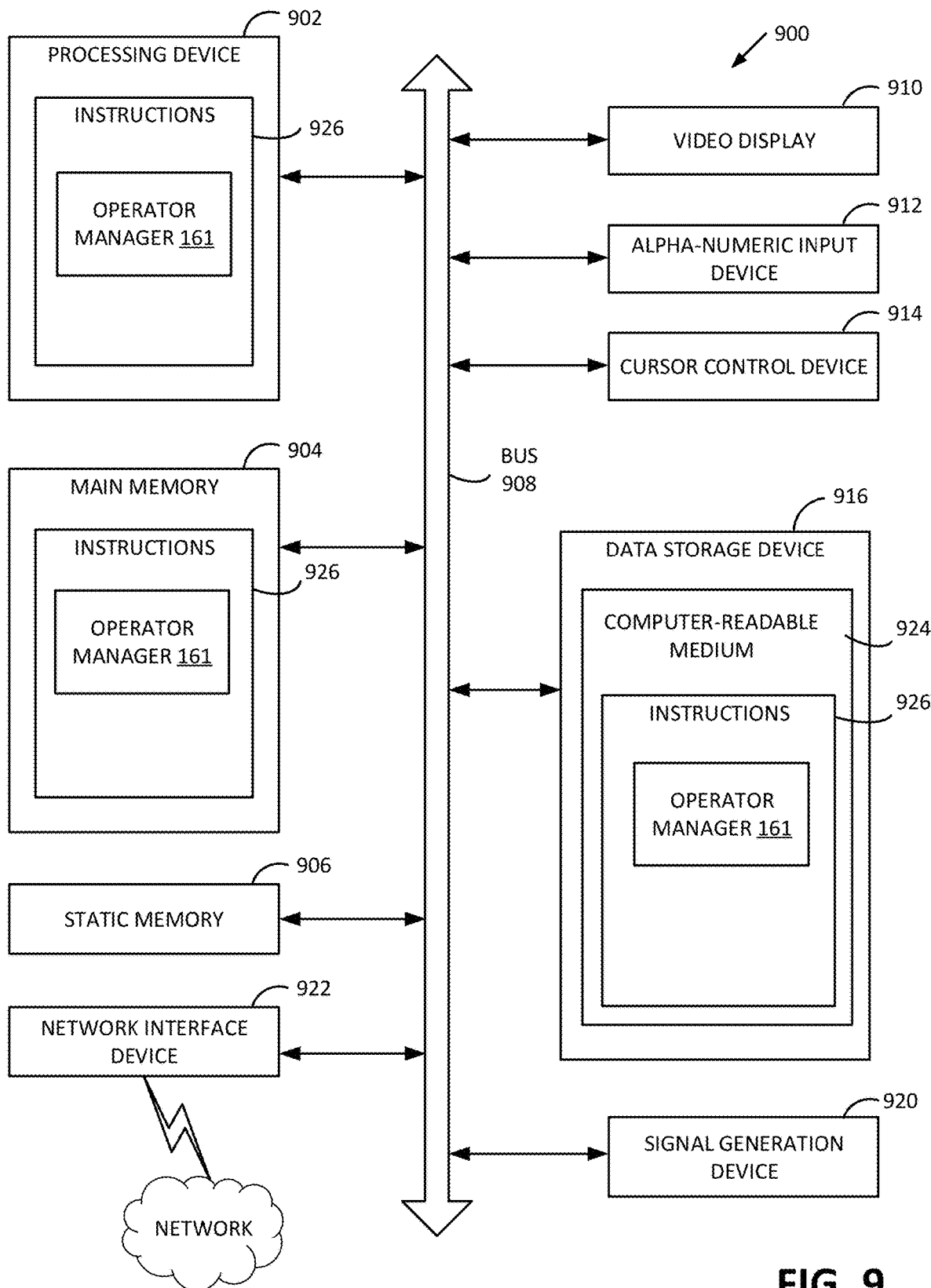
FIG. 9 depicts a block diagram of an illustrative computer system operating in accordance with one or more aspects of the present disclosure.

FIG. 9 depicts an example computer system 900 which can perform any one or more of the methods described herein. In one example, computer system 900 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 900 includes a processing device 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 916, which communicate with each other via a bus 908.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute processing logic (e.g., instructions 926) that includes operator manager 161 for performing the operations and steps discussed herein (e.g., corresponding to the method of FIGS. 4 and 5, etc.).

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker). In one illustrative example, the video display unit 910, the alphanumeric input device 912, and the cursor control device 914 may be combined into a single component or device (e.g., an LCD touch screen).

The data storage device 916 may include a non-transitory computer-readable medium 924 on which may store instructions 926 that include operator manager 161 (e.g., corresponding to the method of FIGS. 4 and 5, etc.) embodying any one or more of the methodologies or functions described herein. Operator manager 161 may also reside, completely or at least partially, within the main memory 904 and/or within the processing device 902 during execution thereof by the computer system 900, the main memory 904 and the processing device 902 also constituting computer-readable media. Operator manager 161 may further be transmitted or received over a network via the network interface device 922.

While the computer-readable storage medium 924 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Other computer system designs and configurations may also be suitable to implement the systems and methods described herein. The following examples illustrate various implementations in accordance with one or more aspects of the present disclosure.

Example 1 is a method comprising: receiving, by a processing device, meta-operator generation data, the meta-operator generation data comprising an identifier of an operator of a group of operators to be installed on a containerized computing services platform; determining, by the processing device, that the group of operators is complete; and responsive to determining that the group of operators is complete, generating, by the processing device based on the meta-operator generation data, a meta-operator comprising instructions for managing installation of the group of operators.

Example 2 is the method of Example 1, wherein the meta-operator generation data further comprises at least one of: a meta-operator name, a meta-operator description, or an icon.

Example 3 is the method of Example 1, further comprising: obtaining, by the processing device, a list of operators matching the identifier of the first operator by querying an image registry; and receiving, by the processing device, a selected operator from the list.

Example 4 is the method of Example 3, further comprising obtaining, by the processing device, operator metadata associated with the selected operator.

Example 5 is the method of Example 4, wherein obtaining the operator metadata comprises downloading the second set of metadata from an image registry.

Example 6 is the method of Example 4, further comprising receiving, by the processing device, additional installation information in view of the operator metadata.

Example 7 is the method of Example 6, wherein the additional installation information comprises at least one of a version that should be installed, an installation namespace, an installation scope, and an upgrade strategy.

Example 8 is a method comprising: receiving, by a processing device, a request to install a meta-operator for managing installation of a group of operators on a containerized computing services platform; installing, by the processing device, the meta-operator on the containerized computing services platform; obtaining, by the processing device, installation data comprising information for installing the group of operators; and managing, by the meta operator, the group of operators in view of the installation data.

Example 9 is the method of Example 8, further comprising determining, by the processing device, that the group of operators is installable prior to installing the group of operators.

Example 10 is the method of Example 9, wherein the installation data further comprises pre-installation validation instructions, and wherein determining that the group of operators is installable comprises executing the pre-installation validation instructions.

Example 11 is the method of Example 8, wherein managing the group of operators comprises triggering installation of the group of operators using resources associated with an operator lifecycle manager.

Example 12 is the method of Example 8, wherein the installation data further comprises post-installation validation instructions, and wherein managing the group of operators comprises determining that installation of the group of operators was successful by executing the post-installation validation instructions.

Example 13 is the method of Example 8, further comprising: rendering, via a graphical user interface, at least one of: an installation progress indicator or an installation result indicator.

Example 14 is a computing system comprising: a memory; and a processing device, operatively coupled to the memory, to: receive meta-operator generation data, the meta-operator generation data comprising an identifier of an operator of a group of operators to be installed on a containerized computing services platform; determine that the group of operators is complete; and responsive to determining that the group of operators is complete, generate, in view of the meta-operator generation data, a meta-operator comprising instructions for managing installation of the group of operators.

Example 15 is the computing system of Example 14, wherein the meta-operator data further comprises at least one of: a meta-operator name, a meta-operator description, or an icon.

Example 16 is the computing system of Example 14, wherein the processing device is further to: obtain a list of operators matching the identifier of the first operator by querying an image registry; and receive a selected operator from the list.

Example 17 is the computing system of Example 14, wherein the processing device is further to obtain operator parameters associated with the selected operator.

Example 18 is the computing system of Example 17, wherein the processing device is to obtain the operator parameters by downloading the operator parameters from an image registry.

Example 19 is the computing system of Example 17, wherein the processing device is further to receive additional installation information in view of the operator parameters.

Example 20 is the computing system of Example 19, wherein the additional installation information comprises at least one of a version that should be installed, an installation namespace, an installation scope, and an upgrade strategy.

Example 21 is a computing system comprising: a memory; and a processing device, operatively coupled to the memory, to: receive, via a user interface, a request to install a meta-operator for managing installation of a group of operators on a containerized computing services platform; install the meta-operator on the containerized computing services platform to obtain an installed meta-operator;

obtain installation data for installing the group of operators using the installed meta-operator; manage the group of operators in view of the installation data using the installed meta-operator; and render, via a graphical user interface, at least one of: an installation progress indicator or an installation result indicator.

Example 22 is the computing system of Example 21, wherein the processing device is further to determine that the group of operators is installable prior to installing the group of operators.

Example 23 is the computing system of Example 22, wherein the installation data further comprises pre-installation validation instructions, and wherein determining that the group of operators is installable comprises executing the pre-installation validation instructions.

Example 24 is the computing system of Example 21, wherein the processing device is to manage the group of operators comprises by triggering installation of the group of operators using resources associated with an operator lifecycle manager.

Example 25 is the computing system of Example 21, wherein the installation data further comprises post-installation validation instructions, and wherein managing the group of operators comprises determining that installation of the group of operators was successful by executing the post-installation validation instructions.

Example 26 is a non-transitory computer readable storage medium, having instructions stored therein, which when executed by a processing device of a computer system, cause the processing device to: send a request for meta-operator generation data, the meta-operator generation data comprising an identifier of an operator of a group of operators to be installed on a containerized computing services platform; receive, via a graphical user interface, the meta-operator generation data; obtain a list of operators matching the name of the first operator by querying an image registry; receive, via the graphical user interface, a selected operator from the list; determine that the group of operators is complete after receiving the selected operator; and responsive to determining that the group of operators is complete, generate, in view of the meta-operator generation data and the operator parameters, a meta-operator comprising instructions for managing installation of the group of operators.

Example 27 is the non-transitory computer readable storage medium of Example 26, wherein the meta-operator generation data further comprises at least one of: a meta-operator identifier, a meta-operator description, or an icon.

Example 28 is the non-transitory computer readable storage medium of Example 26, wherein the processing device is further to obtain operator parameters associated with the selected operator by downloading the second set of metadata from the image registry.

Example 29 is the non-transitory computer readable storage medium of Example 28, wherein the processing device is further to receive additional installation information in view of the operator parameters.

Example 30 is the non-transitory computer readable storage medium of Example 29, wherein the additional installation information comprises at least one of a version that should be installed, an installation namespace, an installation scope, and an upgrade strategy.

Example 31 is a non-transitory computer readable storage medium, having instructions stored therein, which when executed by a processing device of a computer system, cause the processing device to: receive, via a graphical user interface, a request to install a meta-operator for managing installation of a group of operators on a containerized computing services platform, the meta-operator comprising pre-validation instructions and post-validation instructions; in response to receiving the request, install the meta-operator on the containerized computing services platform to obtain an installed meta-operator; obtain installation data comprising information for installing the group of operators using the installed meta-operator; determine that the group of operators can be installed by executing the pre-installation validation instructions; manage the group of operators in view of the installation data using the installed meta-operator, wherein the processing device is to determine that the installation of the group of operators was successful by executing the post-installation validation instructions; and render, via the graphical user interface, at least one of: an installation progress indicator or an installation results indicator.

Example 32 is the non-transitory computer readable storage medium of Example 31, wherein the processing device is to manage the group of operators by triggering the installing of the group of operators using resources associated with an operator lifecycle manager.

Example 33 is an apparatus comprising: a processing device; means for receiving meta-operator generation data, the meta-operator generation data comprising an identifier of an operator of a group of operators to be installed on a containerized computing services platform; means for determining that the group of operators is complete; and responsive to determining that the group of operators is complete, means for generating, based on the meta-operator generation data, a meta-operator comprising instructions for managing installation of the group of operators.

Example 34 is the apparatus of Example 33, wherein the meta-operator generation data further comprises at least one of: a meta-operator name, a meta-operator description, or an icon.

Example 35 is the apparatus of Example 33, further comprising: means for obtaining a list of operators matching the identifier of the first operator by querying an image registry; and means for receiving a selected operator from the list.

Example 36 is the apparatus of Example 35, further comprising means for obtaining operator metadata associated with the selected operator.

Example 37 is the apparatus of Example 36, wherein the means for obtaining the operator metadata comprises means for downloading the second set of metadata from an image registry.

Example 38 is the apparatus of Example 36, further comprising means for receiving additional installation information in view of the operator metadata.

Example 39 is the apparatus of Example 38, wherein the additional installation information comprises at least one of a version that should be installed, an installation namespace, an installation scope, and an upgrade strategy.

Example 40 is an apparatus comprising: a processing device; means for receiving a request to install a meta-operator for managing installation of a group of operators on a containerized computing services platform; means for installing the meta-operator on the containerized computing services platform; means for obtaining installation data comprising information for installing the group of operators; and means for managing the group of operators in view of the installation data.

Example 41 is the apparatus of Example 40, further comprising means for determining that the group of operators is installable prior to installing the group of operators.

Example 42 is the apparatus of Example 41, wherein the installation data further comprises pre-installation validation instructions, and wherein the means for determining that the group of operators is installable comprises means for executing the pre-installation validation instructions.

Example 43 is the apparatus of Example 40, wherein the means for managing the group of operators comprises means for triggering installation of the group of operators using resources associated with an operator lifecycle manager.

Example 44 is the apparatus of Example 40, wherein the installation data further comprises post-installation validation instructions, and wherein the means for managing the group of operators comprises means for determining that installation of the group of operators was successful by executing the post-installation validation instructions.

Example 45 is the apparatus of Example 40, further comprising means for rendering, via a graphical user interface, at least one of: an installation progress indicator or an installation result indicator.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "providing," "selecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
   receiving, by a processing device, a set of meta-operator parameters for a meta-operator to be generated for managing installation of a group of operators on a containerized computing services platform, the set of meta-operator parameters comprising a meta-operator identifier;
   receiving, by the processing device, an identifier of an operator of the group of operators to be installed on the containerized computing services platform;
   adding, by the processing device in view of the identifier, the operator to the group of operators;
   determining, by the processing device, whether the group of operators is complete; and
   responsive to determining that the group of operators is complete, generating, by the processing device in view of the set of meta-operator parameters, the meta-operator, the meta-operator comprising instructions for managing the installation of the group of operators on the containerized computing services platform.

2. The method of claim 1, wherein the set of meta-operator parameters comprises at least one of: a meta-operator name, a meta-operator description, or an icon.

3. The method of claim 1, further comprising:
obtaining, by the processing device, a list of operators matching the identifier of the operator by querying an image registry; and
receiving, by the processing device, a selected operator from the list.

4. The method of claim 3, further comprising obtaining, by the processing device, a set of operator parameters associated with the selected operator.

5. The method of claim 4, wherein obtaining the set of operator parameters comprises downloading the set of operator parameters from an image registry.

6. The method of claim 4, further comprising receiving, by the processing device, additional installation information in view of the set of operator parameters.

7. The method of claim 6, wherein the additional installation information comprises at least one of: a version that should be installed, an installation namespace, an installation scope, or an upgrade strategy.

8. A method comprising:
generating, by a processing device in view of a set of meta-operator parameters comprising a meta-operator parameter, a meta-operator comprising instructions for managing installation of a group of operators on a containerized computing services platform, wherein generating the meta-operator comprises adding each operator to the group of operators based on a respective operator identifier;
installing, by the processing device, the meta-operator on the containerized computing services platform to obtain an installed meta-operator;
obtaining, by the processing device, installation data for installing the group of operators on the containerized computing services platform using the installed meta-operator; and
managing, by the processing device, installation of the group of operators on the containerized computing services platform in view of the installation data using the installed meta-operator.

9. The method of claim 8, further comprising determining, by the processing device, that the group of operators is installable prior to installing the group of operators.

10. The method of claim 9, wherein the installation data further comprises pre-installation validation instructions, and wherein determining that the group of operators is installable comprises executing the pre-installation validation instructions.

11. The method of claim 8, wherein managing installation of the group of operators comprises triggering installation of the group of operators using resources associated with an operator lifecycle manager.

12. The method of claim 8, wherein the installation data further comprises post-installation validation instructions, and wherein managing installation of the group of operators comprises determining that installation of the group of operators was successful by executing the post-installation validation instructions.

13. The method of claim 8, further comprising: rendering, via a graphical user interface, at least one of: an installation progress indicator or an installation result indicator.

14. A computing system comprising:
a memory; and
a processing device, operatively coupled to the memory, to:
receive a set of meta-operator parameters for a meta-operator to be generated for managing installation of a group of operators on a containerized computing services platform, the set of meta-operator parameters comprising a meta-operator identifier;
receive an identifier of an operator of the group of operators to be installed on the containerized computing services platform;
add, in view of the identifier, the operator to the group of operators;
determine whether group of operators is complete; and
responsive to determining that the group of operators is complete, generate, in view of the set of meta-operator parameters, the meta-operator, the meta-operator comprising instructions for managing the installation of the group of operators on the containerized computing services platform.

15. The computing system of claim 14, wherein the set of meta-operator parameters comprises at least one of: a meta-operator name, a meta-operator description, or an icon.

16. The computing system of claim 14, wherein the processing device is further to:
obtain a list of operators matching the identifier of the operator by querying an image registry; and
receive a selected operator from the list.

17. The computing system of claim 16, wherein the processing device is further to obtain a set of operator parameters associated with the selected operator.

18. The computing system of claim 17, wherein the processing device is to obtain the set of operator parameters by downloading the set of operator parameters from an image registry.

19. The computing system of claim 17, wherein the processing device is further to receive additional installation information in view of the operator parameters.

20. The computing system of claim 19, wherein the additional installation information comprises at least one of: a version that should be installed, an installation namespace, an installation scope, or an upgrade strategy.

* * * * *